US008819669B2

(12) United States Patent
Dei et al.

(10) Patent No.: US 8,819,669 B2
(45) Date of Patent: Aug. 26, 2014

(54) INFORMATION PROCESSING APPARATUS AND FUNCTION EXPANSION METHOD

(75) Inventors: Hiroaki Dei, Kanagawa (JP); Seiichi Aoyagi, Tokyo (JP); Naoya Okamoto, Tokyo (JP); Yusuke Sakai, Kanagawa (JP)

(73) Assignee: Sony Corporation (JP)

( * ) Notice: Subject to any disclaimer, the term of this patent is extended or adjusted under 35 U.S.C. 154(b) by 1121 days.

(21) Appl. No.: 12/583,357

(22) Filed: Aug. 19, 2009

(65) Prior Publication Data

US 2010/0058326 A1 Mar. 4, 2010

(30) Foreign Application Priority Data

Aug. 27, 2008 (JP) ................ P2008-218116

(51) Int. Cl.
*G06F 9/44* (2006.01)
*G06F 9/445* (2006.01)
(52) U.S. Cl.
CPC ....................................... *G06F 8/61* (2013.01)
USPC .......................................... 717/173; 717/169
(58) Field of Classification Search
CPC ............... G06F 9/30181; G06F 8/65–8/71
USPC ................. 717/101–178; 709/219; 715/810
See application file for complete search history.

(56) References Cited

U.S. PATENT DOCUMENTS

| 6,757,720 | B1* | 6/2004 | Weschler, Jr. ................. 709/220 |
| 7,000,230 | B1* | 2/2006 | Murray et al. ................. 717/172 |
| 7,096,461 | B1* | 8/2006 | Nakamura et al. ............ 717/139 |
| 7,765,248 | B2* | 7/2010 | Kanasaki ...................... 709/203 |
| 8,156,208 | B2* | 4/2012 | Bornhoevd et al. ........... 709/221 |
| 2003/0137693 | A1* | 7/2003 | Nishio ......................... 358/1.15 |
| 2004/0090652 | A1* | 5/2004 | Yoon ............................ 358/1.16 |
| 2004/0117473 | A1* | 6/2004 | Yamamura et al. ........... 709/223 |
| 2005/0119031 | A1* | 6/2005 | Spalink et al. ................ 455/566 |
| 2006/0041665 | A1* | 2/2006 | Karnik et al. ................. 709/228 |
| 2006/0195685 | A1* | 8/2006 | Kawabe .......................... 713/1 |

(Continued)

FOREIGN PATENT DOCUMENTS

| EP | 1814321 B1 * | 1/2013 |
| JP | 2002215918 A | 8/2002 |
| JP | 2004512578 T | 4/2004 |
| JP | 2004348268 A | 12/2004 |

(Continued)

OTHER PUBLICATIONS

Inline Function Expansion for Compiling C Programs—Wen-mei W. Hwu and Pohua P. Chang—Coordinated Science Laboratory University of Illinois—1989.*

(Continued)

*Primary Examiner* — Lewis A Bullock, Jr.
*Assistant Examiner* — Francisco Aponte
(74) *Attorney, Agent, or Firm* — Lerner, David, Littenberg, Krumholz & Mentlik, LLP

(57) ABSTRACT

An information processing apparatus receives index information about an expansion function realized by being linked to a predetermined service provided by an external apparatus from a server apparatus connected via a network, displays a menu of information representing the expansion functions on a display screen, based on the index information, downloads software for executing the expansion function based on location information of the software when the expansion function being executed in accordance with a user selection on the menu on the display screen; the location information contained in the index information, and uses the downloaded software to executes the expansion function selected by an user.

10 Claims, 11 Drawing Sheets

(56) References Cited

U.S. PATENT DOCUMENTS

| | | | |
|---|---|---|---|
| 2007/0027967 A1* | 2/2007 | Hatayama et al. | 709/220 |
| 2007/0041043 A1* | 2/2007 | Murakami et al. | 358/1.15 |
| 2008/0007792 A1* | 1/2008 | Sun et al. | 358/403 |
| 2008/0055667 A1* | 3/2008 | Baba | 358/448 |
| 2008/0140671 A1* | 6/2008 | Tien et al. | 707/10 |
| 2008/0148335 A1* | 6/2008 | Dawson et al. | 725/132 |
| 2008/0307485 A1* | 12/2008 | Clement et al. | 725/152 |
| 2009/0327397 A1* | 12/2009 | Chen et al. | 709/202 |

FOREIGN PATENT DOCUMENTS

| | | |
|---|---|---|
| JP | 2005-303553 A | 10/2005 |
| JP | 2008066887 A | 3/2008 |
| WO | 2007108302 A1 | 9/2007 |

OTHER PUBLICATIONS

Office Action from Japanese Application No. 2008-218116, dated Mar. 30, 2010.

* cited by examiner

FIG. 5

EXAMPLE OF EXPANSION FUNCTION INDEX INFORMATION

| FUNCTION ID | FUNCTION NAME (MENU CHOICE NAME) | WIDGET LOCATION INFORMATION | SERVICE ID (WIDGET ID) | SERVICE NAME (WIDGET NAME) | SERVICE AVAILABILITY | SERVICE START DATE/TIME, END DATE/TIME, PAUSE PERIOD | MENU DISPLAY LOCATION | COMPATIBLE DEVICE INFORMATION | COMPATIBLE FORMAT |
|---|---|---|---|---|---|---|---|---|---|
| 123 | UPLOAD | www.······ | AAA | SERVICE A | START | 2007/1/1 | HIGHEST PORTION | DEVICE A~F | JPEG,RAW |
| 123 | UPLOAD | www.······ | BBB | SERVICE B | END | 2008/5/1 | HIGHEST PORTION | DEVICE A~F | JPEG,RAW |
| 123 | UPLOAD | www.······ | CCC | SERVICE C | DOWN | 2008/9/1~2008/12/31 | LOWEST PORTION | DEVICE A~C | JPEG,RAW |
| 123 | UPLOAD | www.······ | DDD | SERVICE D | START | 2007/12/2 | LOWEST PORTION | DEVICE D~G | JPEG |
| 321 | DOWNLOAD | www.······ | XXX | SERVICE X | START | 2007/3/3 | MIDDLE | DEVICE A~Z | JPEG,RAW |
| 321 | DOWNLOAD | www.······ | YYY | SERVICE Y | BEFORE START | 2009/1/1 | HIGHEST PORTION | DEVICE A | JPEG |

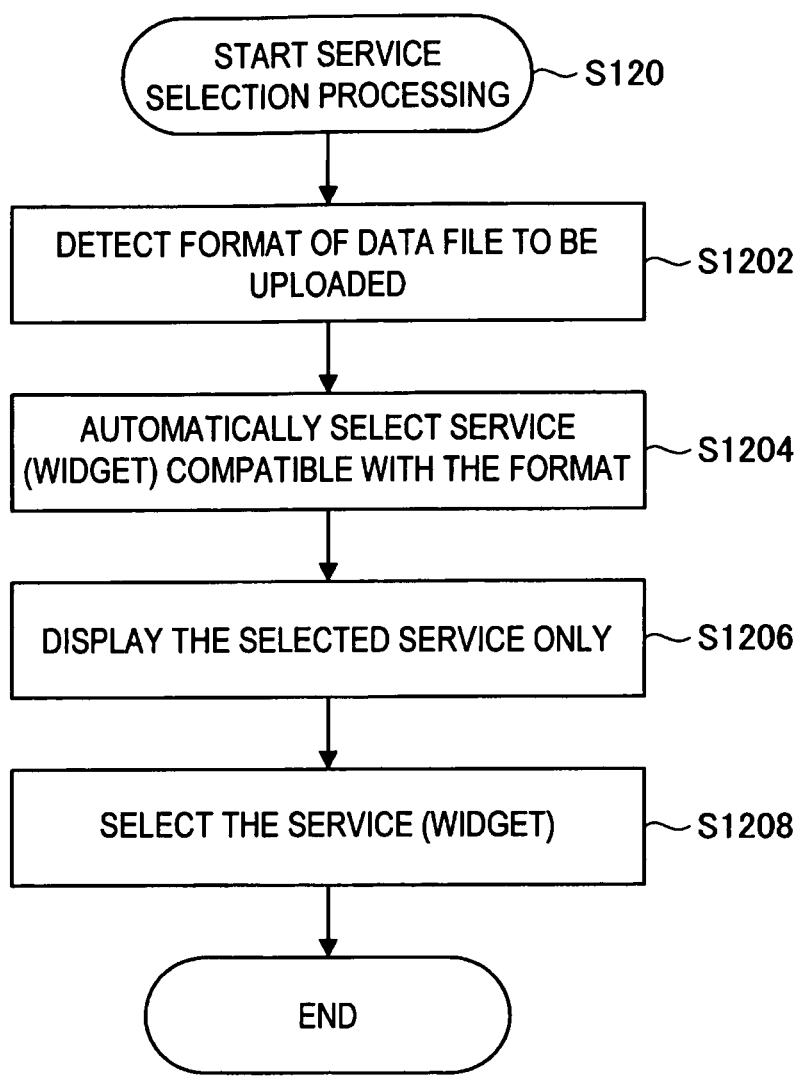

INFORMATION PROCESSING APPARATUS AND FUNCTION EXPANSION METHOD

CROSS-REFERENCE TO RELATED APPLICATION

The present application claims priority from Japanese Patent Application No. JP 2008-218116 filed in the Japanese Patent Office on Aug. 27, 2008, the entire content of which is incorporated herein by reference.

BACKGROUND OF THE INVENTION

1. Field of the Invention

The present invention relates to an information processing apparatus and a function expansion method.

2. Description of the Related Art

In recent years, computerization of various consumer electric appliances has been growing. For example, a television set equipped with a network communication function may not only receive video and sound content of a program from a broadcasting station, but also exchange various kinds of information with a server apparatus providing a predetermined service (See, for example, Japanese Patent Application Laid-Open No. 2005-303553).

A home information appliance such as a television set is called an embedded device and has an embedded system as a computer system. In contrast to a general-purpose computer system, such as a personal computer (PC), an embedded system is a non-general computer system to realize a specific function of an embedded device.

SUMMARY OF THE INVENTION

Incidentally, if an expansion function of an upload function of data files should be realized in an embedded device described above, linkage to a service corresponding to the expansion function will be necessary. However, it is difficult for an embedded device in which the expansion function is mounted in advance to flexibly add, delete, activate, and inactivate the expansion function in accordance with a change of circumstances such as the start, end, and pause of a service. If, for example, a new service is started after embedded devices being manufactured, it is necessary to reactively activate an expansion function mounted in advance in the device. On the other hand, it may become necessary to reactively inactivate an expansion function in the device accompanying a service end. If, regarding an expansion function of the same type, a plurality of services providing the function is available, a corresponding service may be added or deleted. In such cases, it becomes necessary to modify hardware or rewrite software after embedded devices being manufactured or shipped and in view of specifications of embedded devices, such a modification or rewriting is not easy.

In FTP client software on a PC, for example, in order to update a list of a server at the upload destination, it becomes necessary to make new additional settings by user operations based on investigations by the user or to install dedicated software provided by an upload service provider on the PC before data being uploaded. That is, it is necessary for the user to actively react to service changes, which is inconvenient, and users who are unfamiliar with device operations may not be able to deal with such changes.

Further, if the expansion function that can be realized in linkage with the service changes depending on embedded device dependent specifications, it is necessary to change the device modification or rewrite content of software for each embedded device, which is not easy to accomplish.

The present invention has been made in view of the above circumstances and there is a need to make it possible to easily control an expansion function in almost real time in accordance with a change of circumstances of a service and to enable a user to easily recognize the change of circumstances.

According to an embodiment of the present invention, there is provided an information processing apparatus, including: an information receiving unit that receives index information about one or two or more expansion functions realized by being linked to predetermined services provided by an external apparatus from a server apparatus connected via a network; a display control unit that displays a menu of information representing the expansion functions on a display screen, based on the index information; a download unit that downloads software for executing the expansion function based on location information of the software when the expansion function being executed in accordance with a user selection on the menu on the display screen; the location information contained in the index information, and a function execution unit that uses the downloaded software to executes the expansion function selected by an user.

The expansion function may be an upload function to upload a data file from the information processing apparatus to the external apparatus, the index information may contain information representing a format with which an upload service providing the upload function is compatible, and the display control unit may detect a format of the data file to be uploaded, automatically select an upload service compatible with the detected format from among a plurality of upload services based on the information representing the format contained in the index information, and display the menu of the information about the selected upload service on the display screen.

The display control unit may add, delete, activate, or inactivate a display of the information representing the expansion function in the menu on the display screen based on the index information.

The expansion function may be a function realized by communication performed between the external apparatus providing the predetermined service and the information processing apparatus via the network, the index information may contain information representing availability of the predetermined service, and the display control unit may add, delete, activate, or inactivate the display of information representing the expansion function in the menu on the display screen based on the information representing the availability contained the index information.

The index information may contain information about a plurality of services that provide a same type of the expansion function, the display control unit may display the menu of the information representing the expansion function and information representing the plurality of services on the display screen in stages based on the information about the services contained in the index information, and the download unit may download the software for executing the expansion function of the service selected by the user in accordance with a user selection on the menu on the display screen.

The display control unit may display the information representing the plurality of services in the menu on the display screen in a display order in accordance with at least one of a usage frequency of the plurality of services and settings by the user.

The information processing apparatus may further include an information request unit that transmits a transmission request of the index information to the server apparatus via the network. The information request unit may attach attribute information of the information processing apparatus to the transmission request of the index information, and then transmit the transmission request to the server apparatus, the information receiving unit may receive the index information about the expansion functions selected by the server apparatus using the attribute information from the server apparatus, and the display control unit may display the menu of the information representing the expansion functions selected by using the attribute information on the display screen, based on the index information.

The information processing apparatus may be a device equipped with an embedded system as a computer system.

The software may be a widget.

According to another embodiment of the present invention, there is provided a function expansion method, including the steps of: receiving, by an information processing apparatus, index information about one or two or more expansion functions realized by being linked to predetermined services provided by an external apparatus from a server apparatus connected via a network; displaying, by the information processing apparatus, a menu of information representing the expansion functions on a display screen, based on the index information; downloading, by the information processing apparatus, software for executing the expansion function based on location information of the software when the expansion function being executed in accordance with a user selection on the menu on the display screen; the location information contained in the index information; and using, by the information processing apparatus, the downloaded software to executes the expansion function selected by an user.

According to the above configuration, in an information processing apparatus, index information about one or two or more expansion functions realized by being linked to predetermined services provided by an external apparatus from a server apparatus connected via a network is received, information representing the expansion functions is displayed in a menu of a display screen based on the index information, software for executing the expansion function is downloaded based on location information contained in the index information of the software for executing the expansion function when the expansion function is executed in accordance with a selection of a user from the menu of the display screen, and the expansion function selected by the user is executed using the downloaded software. Thus, the information processing apparatus acquires index information about an expansion function provided by a predetermined service and makes a user recognize the expansion function by displaying information about the expansion function when the expansion function is executed and downloads software of the expansion function using location information contained in the index information to realize the expansion function by executing the software.

According to the embodiments of the present invention described above, it becomes possible to easily control an expansion function in almost real time in accordance with a change of circumstances of a service and to enable a user to easily recognize the change of circumstances.

BRIEF DESCRIPTION OF THE DRAWINGS

FIG. 5 is an explanatory view showing a concrete example of index information according to the embodiment;

FIG. 9 is a flow chart showing a service selection flow in a television set 10 according to a second embodiment of the present invention.

DETAILED DESCRIPTION OF THE PREFERRED EMBODIMENTS

Figure 1:
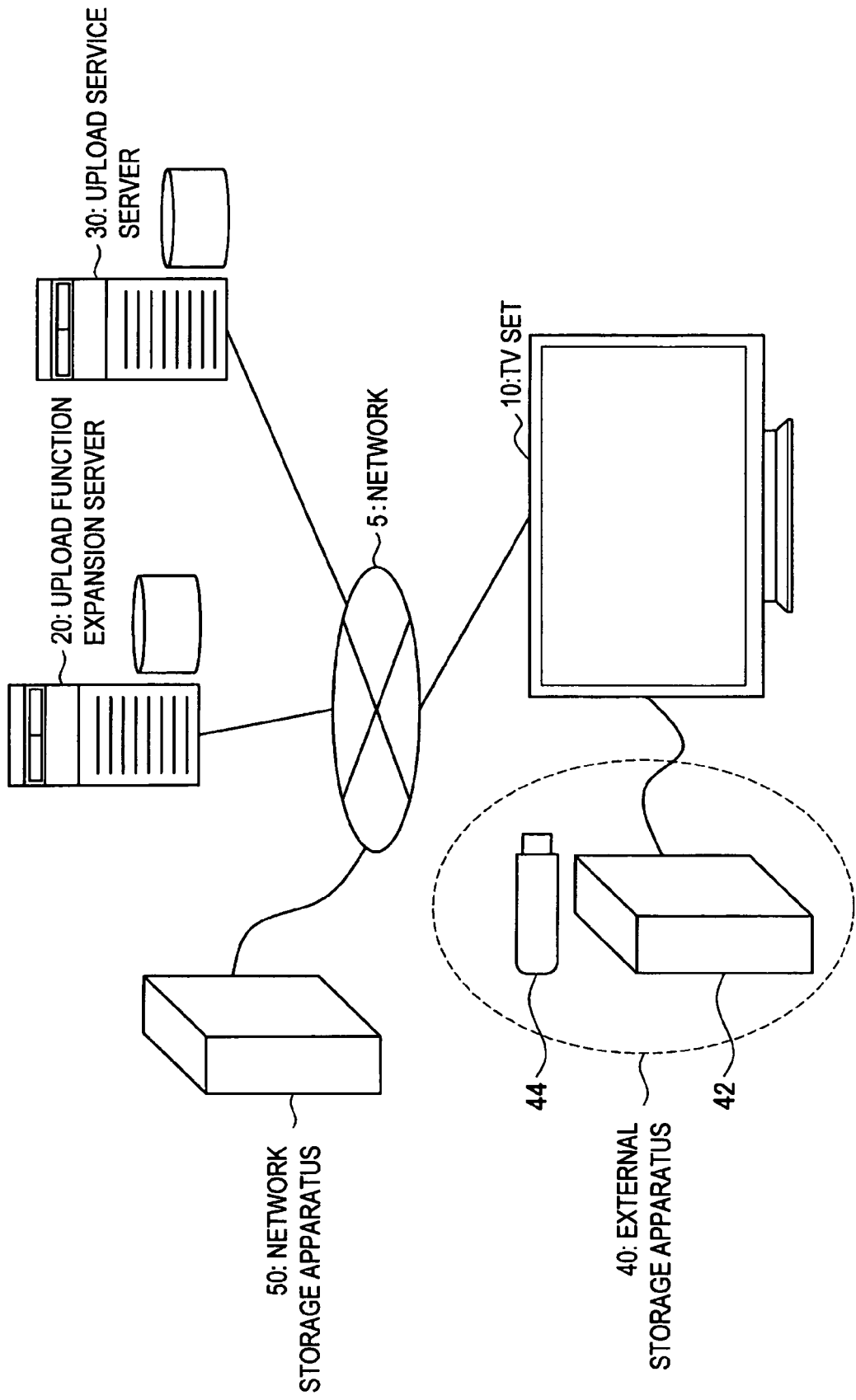
FIG. 1 is a schematic configuration diagram showing a communication system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be provided in the order shown below:
1. First embodiment (function expansion by a download using index information)
2. Second embodiment (automatic selection of services used based on the data format)

First Embodiment

Overall System Configuration

First, an overview of a communication system according to the first embodiment of the present invention will be described with reference to FIG. 1. FIG. 1 is a schematic configuration diagram showing a communication system according to the present embodiment.

In the description below, an example of a television set is taken as an example of an information processing apparatus according to an embodiment of the present invention, an upload function is taken as an expansion function, and an example in which the upload function is realized in the television set will be described.

As shown in FIG. 1, a communication system according to the present embodiment includes the television set 10 connectable to a network 5, an upload function expansion server 20, an upload service server 30, an external storage device 40, and a network storage device 50. The television set 10, the upload function expansion server 20, the upload service server 30, and the network storage device 50 are mutually communicably connected via the network 5. The external storage device 40 includes an external storage device or a removable medium 44. The external storage device is, for example, an HDD (Hard Disk Drive) 42. The removable medium 44 is, for example, a USB (Universal Serial Bus) flash memory, memory card, or optical disk (for example, a DVD or CD). The external storage device 40 is freely detachably connected to the television set.

The network 5 is a communication network that mutually communicably connects the television set 10, the upload function expansion server 20, the upload service server 30, and the network storage device 50 and it does not matter whether communication is performed by wire or by radio. As the network 5, for example, a public network such as the Internet, a telephone network, and a satellite communication network or a dedicated network such as various kinds of LAN (Local Area Network) including Ethernet (registered trademark), WAN (Wide Area Network), and IP-VPN (Internet Protocol-Virtual Private Network) can be used.

The television set (hereinafter, referred to as the TV set) 10 is a display apparatus used by a user to view video/sound content such as television broadcasting programs. The TV set 10 receives program content of television broadcasting from a broadcasting station (not shown) via, for example, broadcast waves or a dedicated communication network and displays video of the program in a display screen. A broadcasting program may be a program of any television broadcasting system such as BS broadcasting, CS broadcasting, terrestrial digital broadcasting, terrestrial analog broadcasting, and cable broadcasting. A program also contains delivery content of, for example, IPTV (Internet Protocol Television) and VOD (Video On demand). The TV set 10 also has a network communication function and can acquire content from an external device such as the network storage device 50 and a content delivery server (not shown) via the network 5. The TV set 10 can also acquire content from the external storage device 40 such as the HDD 42 and the removable medium 44.

Content handled by the TV set 10 is not limited to, for example, the above television programs and may be video content consisting of still images or dynamic images constituting a movie, video program, photo, photo dynamic image and the like. In addition, the content may be any kind of content, for example, audio content such as music, a lecture, and a radio program, E-book, a game, and software. An example in which the TV set 10 uploads a data file of video content such as photo data saved in the external storage device 40 or the network storage device 50 to the upload service server 30 is taken below. However, the present invention is not limited to such an example and can upload any other kind of content such as dynamic image content and music content.

The upload function expansion server 20 and the upload service server 30 are constituted by a computer apparatus and can mutually communicate with an information processing apparatus (the TV set 10 in the present embodiment), which is a client, via the network 5.

The upload function expansion server (hereinafter, referred to as the function expansion server) 20 is an example of a server apparatus of the present invention. The function expansion server 20 delivers index information about an expansion function (for example, the upload function) of the TV set 10 to the TV set 10 via the network 5 in response to a request from the TV set 10. The function expansion server 20 also delivers software for the expansion function (for example, the upload function) of the TV set 10 in response to a request from the TV set 10.

The expansion function is an additional function provided to an information processing apparatus by a predetermined service provided by a predetermined external apparatus and the information processing apparatus (the TV set 10) being linked. For example, the expansion function is a function realized by communication being performed between an external apparatus (the service server 30) providing a predetermined service and the information processing apparatus (the TV set 10) via the network 5. For example, the upload function, download function, and receiving function of delivery content can be illustrated as the function.

Index information is attribute information of the expansion function and serves as an index to identify the type of expansion function, location, and service availability. Index information contains, for example, the function name of an expansion function, location information of software to execute the expansion function, service name of the service that provides the additional function, start date/time, end period, and pause period of a service, and information indicating data formats compatible by the service. Of the above information, the location information of software is, for example, address information in the network 5 representing the storage location of the software. As the location information, for example, URI (Universal Resource Identifier) or URL (Uniform Resource Locator) may be used.

The upload service server (hereinafter, referred to as the service server) 30 is an example of an external apparatus that provides a predetermined service using network communication to an information processing apparatus (the TV set 10 in the present embodiment) as a client. The service server 30 according to the present embodiment provides an upload service to the TV set 10. The upload service is a service used by the TV set 10 to upload a data file held by TV set 10 to an external apparatus via the network 5. The TV set 10 is enabled to execute the upload function as an expansion function after upload software being installed. The service server 30 supports the upload function of the TV set 10. Accordingly, the TV set 10 is enabled to upload a data file saved in the external storage device 40 or the network storage device 50 connected to the TV set 10 to a desired external apparatus (for example, the service server 30) via the network 5.

While one service server 30 is shown in FIG. 1, when a plurality of services (for example, the upload service and download service) is provided, a plurality of service servers may be provided for each service. When a plurality of operators provides the same type of service, a plurality of service servers may be provided for each operator.

Incidentally, the TV set 10 has an embedded system as a computer system to realize a specific function specific to the TV set 10. In contrast to a general-purpose computer system such as a PC, functions and performance that may be required from an embedded system are limited and available hardware resources are restricted due to strict limitations in terms of costs. For example, a general embedded system includes, when compared with a PC or the like, an inexpensive CPU (Central Processing Unit), less memory, and a ROM (Read Only Memory) containing programs and frequently has neither disk storage device nor input/output device.

Thus, due to constraints of specifications of an embedded system, it is difficult for a TV set in related art equipped with such an embedded system to flexibly deal with a change of circumstances (such as the start, stop, and pause) of a service providing an expansion function, making it difficult to add/delete an expansion function.

Thus, in the present embodiment, a service provided by the service server 30 and index information about an expansion function thereof are delivered from the function expansion server 20 to the TV set 10 via the network 5. Accordingly, the function expansion server 20 can notify the TV set 10 of an addition of a new service, stop or pause of an existing service, change in service content, addition or deletion of a supported service and the like. Further, based on index information acquired from the function expansion server 20, the TV set 10 can display function names of expansion functions that can be executed by the TV set 10 in a menu of a display screen or add, delete, activate, or inactivate the display of such function names.

Then, the TV set 10 downloads software to realize an expansion function when the expansion function is executed based on location information of the software contained in the index information. The source of download is, for example, a server apparatus such as the upload function expansion server 20 and the upload service server 30. As a result, the TV set 10 can realize an expansion function (for example, the upload function) in the TV set 10 by executing the downloaded software.

In this manner, index information of an expansion function is delivered from the function expansion server 20 to the TV set 10. Accordingly, the TV set 10 can detect whether various expansion functions can be executed, circumstances of various services (such as the service start, stop, and pause) that provide the expansion functions, and content of each expansion function (for example, data formats that can be uploaded). Further, it becomes possible for the TV set 10 to execute a new expansion function using software after downloading the software for expansion function from the function expansion server 20 based on index information. Therefore, the TV set 10 can easily add/delete/activate/inactivate an expansion function or add/delete a supported service in almost real time in accordance with a change of circumstances of the service. Also, based on index information, the TV set 10 displays function names of expansion functions in a menu of the display screen or add, delete, activate, or inactivate the display of such function names. Accordingly, the user can easily recognize expansion functions that can be executed in the TV set 10 or a change of circumstances of services.

In the present embodiment, widgets are used as software to realize expansion functions of the TV set 10. A widget is simple application software that is suitable for realizing a specific function. Such a widget can be delivered easily and swiftly from the function expansion server 20 to the TV set 10 via the network 5. Moreover, if the widget is executed in an embedded system of the TV set 10, the processing load thereof is low and power consumption of a memory is small.

[Hardware Configuration of the Television Set]

Figure 2:
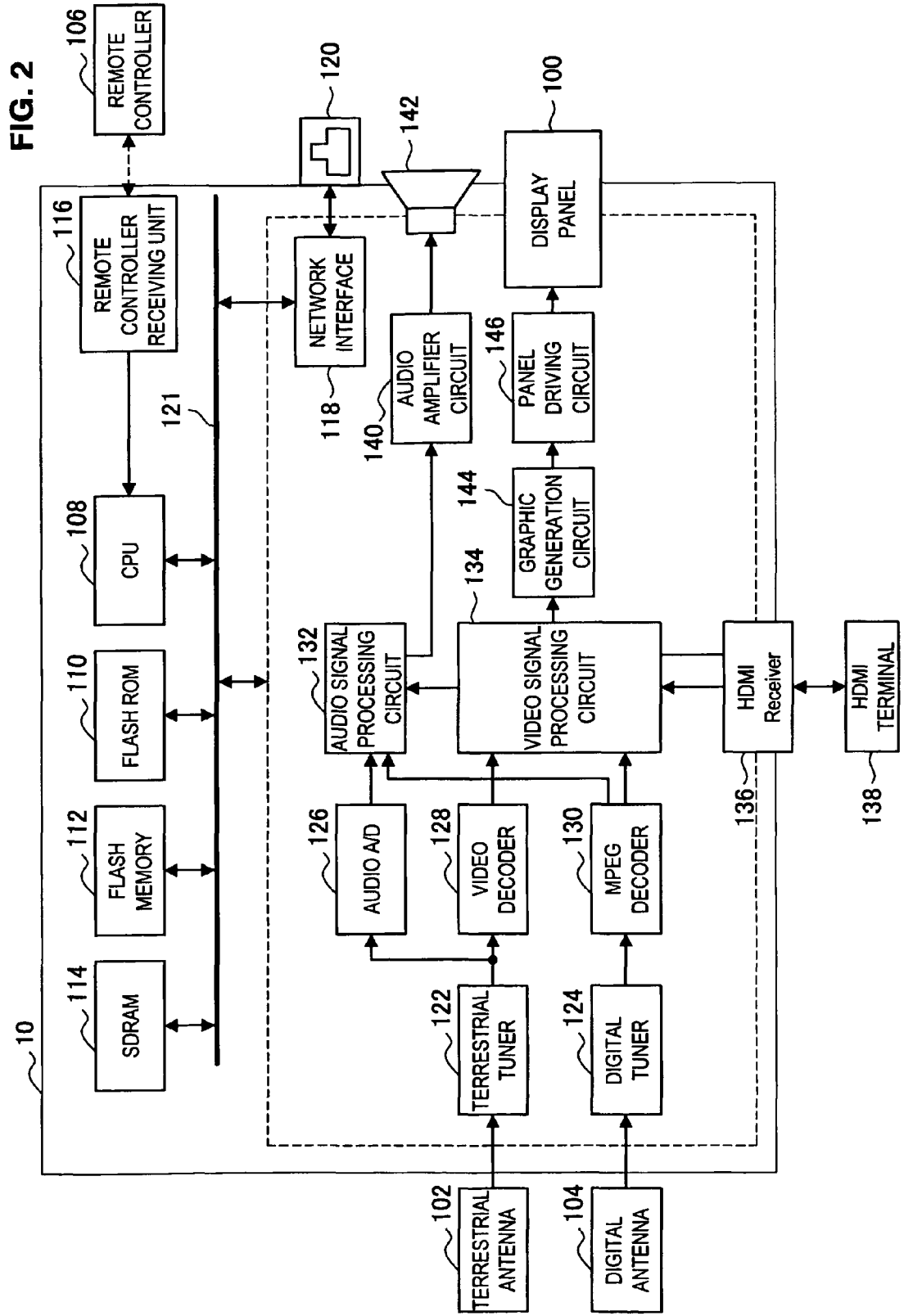
FIG. 2 is a block diagram showing a hardware configuration of a television set according to the embodiment.

Next, the hardware configuration of the TV set 10 according to the present embodiment will be described with reference to FIG. 2. FIG. 2 is a block diagram showing the hardware configuration of the TV set 10 according to the present embodiment.

As shown in FIG. 2, the TV set 10 according to the present embodiment includes a display panel 100, a CPU 108, a flash ROM 110, a flash memory 112, an SDRAM (Synchronous Dynamic Random Access Memory) 114, a remote controller receiving unit 116, a network interface 118, a network terminal 120, a terrestrial tuner 122, a digital tuner 124, an audio A/D conversion circuit 126, a video decoder 128, an MPEG decoder 130, an audio signal processing circuit 132, a video signal processing circuit 134, an HDMI (High-Definition Multimedia Interface) receiver 136, an HDMI terminal 138, an audio amplifier circuit 140, a speaker 142, a graphic generation circuit 144, and a panel driving circuit 146.

The terrestrial tuner 122 receives a broadcast wave signal transmitted from a terrestrial antenna 102 that receives an analog terrestrial signal and demodulates a video signal and audio signal contained in the broadcast wave signal into a base-band signal. Of the base-band signal demodulated by the terrestrial tuner 122, the audio signal is sent to the audio A/D conversion circuit 126 and the video signal to the video decoder 128.

The digital tuner 124 receives a broadcast wave signal transmitted from a digital antenna 104 that receives digital broadcasting and converts a received broadcast wave signal into MPEG2-TS (MPEG2 Transport Stream). The converted MPEG2-TS is sent to the MPEG decoder 130.

The audio A/D conversion circuit 126 receives an analog audio signal demodulated by the terrestrial tuner 122 and converts the analog audio signal into a digital audio signal. The converted digital audio signal is sent to the audio signal processing circuit 132.

The video decoder 128 receives a video signal demodulated by the terrestrial tuner 122 and converts the analog video signal into a digital component signal. The converted digital component signal is sent to the video signal processing circuit 134.

The MPEG decoder 130 receives MPEG2-TS sent from the digital tuner 124 and converts an audio component thereof from the MPEG2-TS into a digital audio signal and a video component thereof from the MPEG2-TS into a digital component signal. The converted digital audio signal is sent to the audio signal processing circuit 132 and the converted digital component signal to the video signal processing circuit 134.

The audio signal processing circuit 132 receives a digital audio signal sent from the audio A/D conversion circuit 126 or the MPEG decoder 130 and performs signal processing on the digital audio signal. The audio signal on which the signal processing is performed is sent to the audio amplifier circuit 140.

The audio amplifier circuit 140 receives an audio signal output from the audio signal processing circuit 132 and amplifies the audio signal by a predetermined amount before the audio signal being output. The amplification amount by the audio amplifier circuit 140 follows the volume instructed by the user of the TV set 10. The audio signal amplified by the audio amplifier circuit 140 is sent to the speaker 142. The speaker 142 outputs sound based on the audio signal sent from the audio amplifier circuit 140.

The video signal processing circuit 134 receives a digital component signal sent from the video decoder 128 or the MPEG decoder 130 and performs signal processing on the digital component signal. The digital component signal on which the signal processing is performed is sent to the graphic generation circuit 144.

The HDMI receiver 136 receives a digital base-band signal input from the HDMI terminal 138, which is an external input terminal. A digital base-band signal received by the HDMI receiver 136 is sent to the audio signal processing circuit 132 and the video signal processing circuit 134, and signal processing on the audio signal and digital component signal is performed respectively.

The graphic generation circuit 144 generates a graphic screen (for example, an operation menu screen of an expansion function) that becomes necessary for operation of the TV set 10. A graphic screen that becomes necessary for operation of the TV set 10 is generated depending on an operation by the user. A graphic screen generated by the graphic generation circuit 144 is sent to the panel driving circuit 146 after being superimposed on a video signal sent from the video signal processing circuit 134 or the video signal being replaced. If no graphic screen is generated, a video signal sent from the video signal processing circuit 134 may be passed directly to the panel driving circuit 146.

The panel driving circuit 146 generates a panel driving signal necessary to display video in the display panel 100 from a video signal sent from the graphic generation circuit 144. The panel driving signal generated by the panel driving circuit 146 is sent to the display panel 100, and video is displayed in the display panel 100 by the display panel 100 being operated in accordance with the panel driving signal.

The display panel 100 displays video (dynamic images or still images) based on a panel driving signal sent from the panel driving circuit 146. The display panel 100 is constituted by, for example, an LCD (Liquid Crystal Display), but may be, in addition, a PDP (Plasma Display Panel) or organic EL (electro-luminescence) panel.

The CPU 108, the flash ROM 110, the flash memory 112, and the SDRAM 114 constitutes an embedded system described above. The embedded system controls each component of the TV set 10 and also executes various expansion functions by operating downloaded software.

The CPU 108 functions as a control unit to control each unit of the TV set 10. The CPU 108 controls each unit of the TV set 10 by reading computer programs stored in the flash ROM 110 and sequentially executing the computer programs. The CPU 108 also reads a computer program of software for expansion function stored in the flash memory 112 and executes the program. Accordingly, an expansion function such as the upload function can be realized in the TV set 10. The flash ROM 110 stores computer programs used by the CPU 108 to control each unit of the TV set 10. The flash memory 112 is a memory to/from which data can freely be written/read and stores a computer program for expansion function downloaded from the function expansion server 20. The SDRAM 114 is a temporary work area used when the CPU 108 executes each of the above computer programs.

The remote controller receiving unit 116 receives a signal transmitted from a remote controller 106. The signal received by the remote controller receiving unit 116 is input into the CPU 108. The CPU 108 decodes control code contained in the signal and controls each unit of the TV set 10 so as to behave (volume adjustments, channel settings, operation menu display and the like) in accordance with the control code.

The network interface 118 receives data input from the network terminal 120 via the network 5 or transmits data to the network 5 via the network terminal 120. After receiving data (for example, software for expansion function or index information) via the network 5, the network interface 118 sends the received data to the CPU 108. The CPU 108 analyzes data acquired via the network 5 or saves the data in the flash memory 112.

Each unit of the TV set 10 is mutually connected by an internal bus 121 so that each unit of the TV set 10 can be controlled by the CPU 108. The TV set 10 and the remote controller 106 may mutually communicate by radio. Alternatively, an input unit consisting of buttons, dials and the like for user operation may be provided in the main body of the TV set 10.

[Hardware Configuration of the Server Apparatus]

Figure 3:
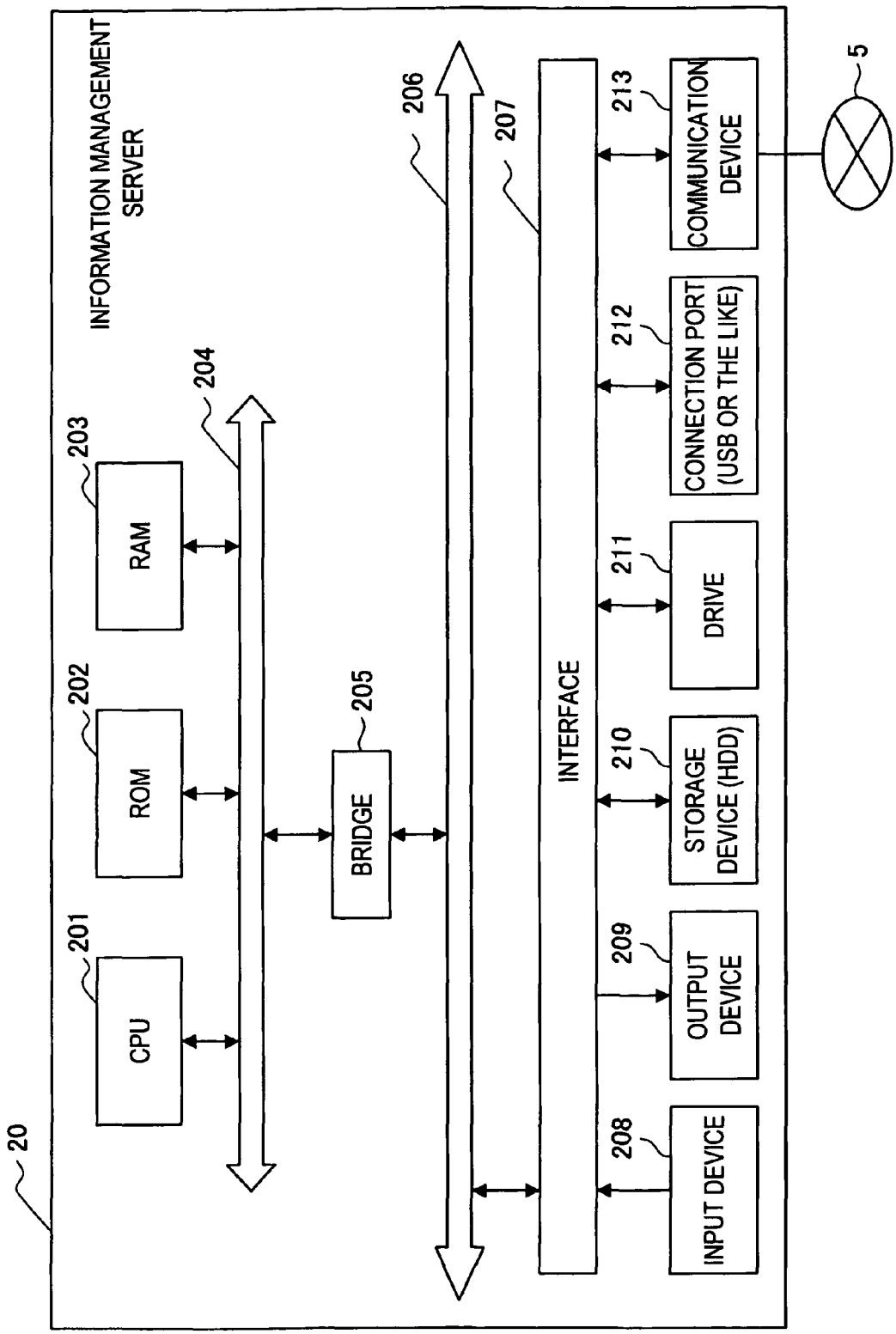
FIG. 3 is a block diagram showing the hardware configuration of a function expansion server according to the embodiment.

Next, the hardware configuration of the function expansion server 20 according to the present embodiment will be described with reference to FIG. 3. FIG. 3 is a block diagram showing the hardware configuration of the function expansion server 20 according to the present embodiment. The hardware configuration of the service server 30 is similar to that of the function expansion server 20 in FIG. 2.

As shown in FIG. 3, the function expansion server 20 includes, for example, a CPU 201, a ROM 202, a RAM 203, a host bus 204, a bridge 205, an external bus 206, an interface 207, an input device 208, an output device 209, a storage device (HDD) 210, a drive 211, a connection port 212, and a communication device 213. Thus, the function expansion server 20 can be constituted by using, for example, a general-purpose computer device.

The CPU 201 functions as an arithmetic processing unit and a control apparatus, operates following various programs, and controls each unit in the function expansion server 20. The CPU 201 performs various kinds of processing according to programs stored in the ROM 202 or those loaded from the storage device 210 into the RAM 203. The ROM 202 stores programs and arithmetic parameters used by the CPU 201 and also functions as a buffer to reduce access from the CPU 201 to the storage device 210. The RAM 203 temporarily stores programs used for execution of the CPU 201 and parameters that change according to circumstances during execution thereof. These units are mutually connected by the host bus 204 constituted by a CPU bus or the like. The host bus 204 is connected to the external bus 206 such as a PCI (Peripheral Component Interconnect/Interface) bus via the bridge 205.

The input device 208 includes, for example, an operation means such as a mouse, keyboard, touch panel, button, switch, and lever and an input/output control circuit that generates an input signal and outputs the input signal to the CPU 201. The output device 209 includes, for example, a display apparatus such as a CRT (Cathode Ray Tube) display apparatus, liquid crystal display (LCD) apparatus, and lamp and an audio output device such as a speaker. The input device 208 and the output device 209 do not have to be installed.

The storage device 210 is a memory for storing various kinds of data and is constituted by, for example, an external HDD (Hard Disk Drive) or a built-in disk drive. The storage device 210 drives a hard disk, which is a storage medium, to store programs executed by the CPU 201 and various kinds of data. The drive 211 is a reader writer for storage media and is contained in the function expansion server 20 or externally attached thereto. The drive 211 writes/reads various kinds of data to/from a removable storage medium such as a magnetic disk, optical disk, magneto-optical disk, and semiconductor memory loaded into the function expansion server 20.

The connection port 212 is a port for connecting an external peripheral device and has a connection terminal such as USB and IEEE1394. The connection port 212 is connected to the CPU 201 and the like via the interface 207 and the external bus 206, the bridge 205, the host bus 204 and the like. The communication device 213 is, for example, a communication interface made up of communication devices and the like to connect to the network 5. The communication device 213 transmits/receives various kinds of data to/from an external apparatus equipped with a network communication function such as the TV set 10 and the service server 30 via the network 5.

[Function Configuration of the Television Set and Server Apparatus]

Figure 4:
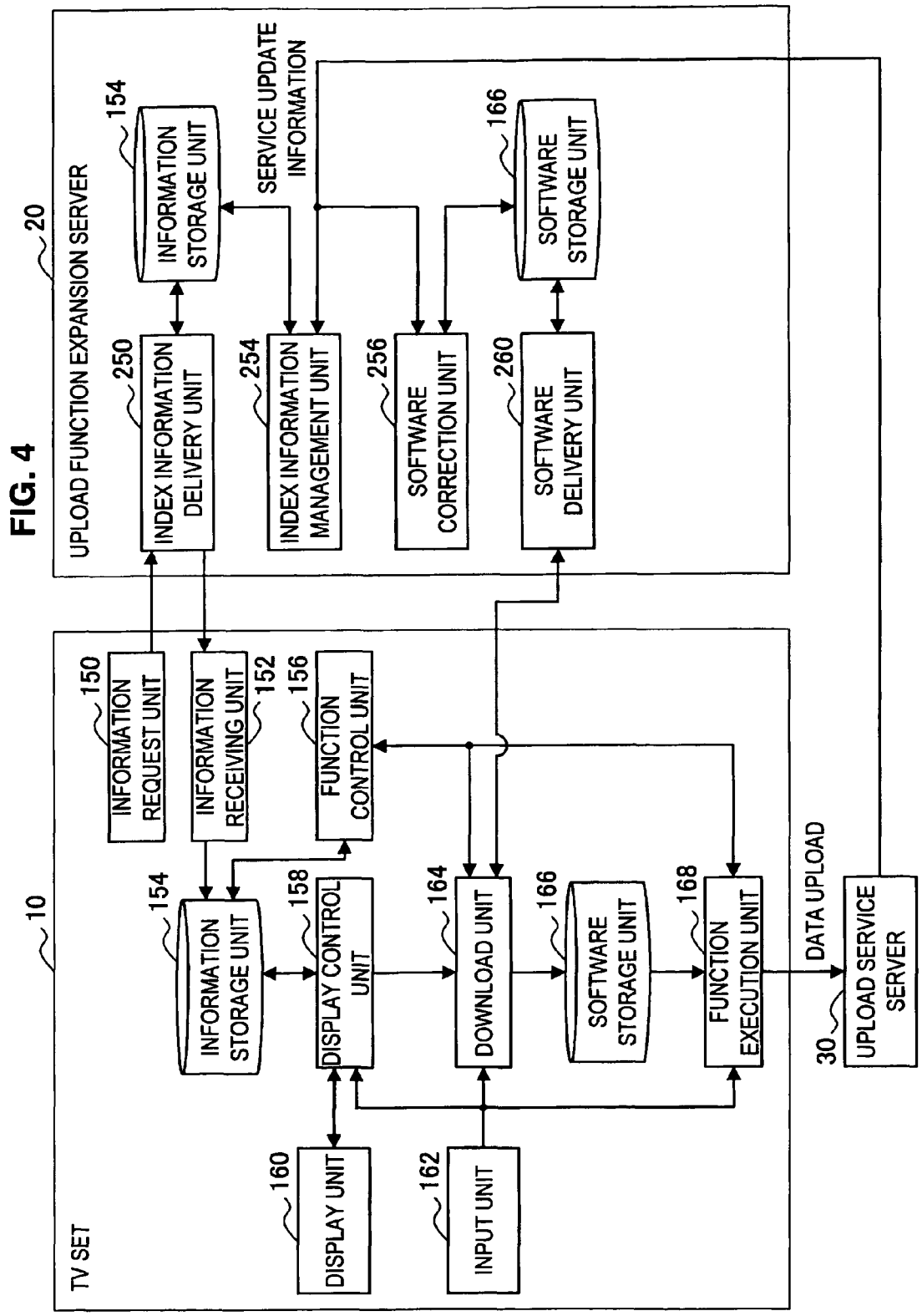
FIG. 4 is a block diagram schematically showing main function units of the television set and the function expansion server according to the embodiment.

Next, the function configuration of the TV set 10 and the function expansion server 20 according to the present embodiment will be described with reference to FIG. 4. FIG. 4 is a block diagram schematically showing main function units of the television set 10 and the function expansion server 20 according to the present embodiment.

As shown in FIG. 4, the TV set 10 includes an information request unit 150, an information receiving unit 152, an information storage unit 154, a function control unit 156, a display control unit 158, a display unit 160, an input unit 162, a download unit 164, a software storage unit 166, and a function execution unit 168. The function expansion server 20 includes an index information delivery unit 250, an information storage unit 252, an index information management unit 254, a software correction unit 256, a software storage unit 258, and a software delivery unit 260.

The information storage unit 154 and the software storage unit 166 in the TV set 10 are constituted by, for example, the flash memory 112 described above (See FIG. 2). The information request unit 150, the information receiving unit 152, the function control unit 156, the display control unit 158, the download unit 164, and the function execution unit 168 in the TV set 10 are realized by installing programs that execute functions of each unit in the TV set 10. The index information delivery unit 250, the index information management unit 254, the software correction unit 256, and the software delivery unit 260 in the function expansion server 20 are realized by installing programs that execute functions of each unit in the function expansion server 20. These programs can be installed by being provided to the TV set 10 or the function expansion server 20 via any communication medium or storage medium. Each unit will be described in detail below.

The information request unit 150 of the TV set 10 requests transmission of index information about an expansion function from the function expansion server 20 connected via the network 5. More specifically, the information request unit 150 automatically transmits an acquisition request of index information to the function expansion server 20 via the network 5. The acquisition request may be transmitted periodically or when an event occurs such as power-on or power-off of the TV set 10 and a user operation.

After receiving an acquisition request of index information from the TV set 10, the index information delivery unit 250 of the function expansion server 20 reads the latest index information stored in the information storage unit 252 and transmits the index information to the TV set 10 via the network 5. As described above, index information is attribute information about an expansion function realized in the TV set 10 by being linked to a predetermined service provided by a predetermined external apparatus. Index information contains, for example, the following information.

Identification information of an expansion function (such as the function ID, service ID, and widget ID)

Function name of an expansion function or menu choice name (such as "upload" and "download")

Location information (for example, URI and URL) of software (for example, a widget) to execute an expansion function Service name or widget name (such as "service A") of a service that provides an expansion function Information about availability of a service (hereinafter, referred to as service availability information)

Start date/time, end date/time, and pause period of a service

Display position information of the function name or menu choice name

Information about devices compatible with an expansion function

Information about formats compatible by a service providing an expansion function (hereinafter, referred to as compatible format information)

Here, a concrete example of index information according to the present embodiment will be described with reference to FIG. 5. In the example shown in FIG. 5, it is evident that services realizing the upload function and download function are provided as expansion functions of the TV set 10. Four services A to D exist for the upload function and two services E and F for the download function. Among these services, the services A, D, and X are already started and currently available. On the other hand, the service B has already ended, the service C is down for maintenance or the like, and the service Y is not yet started. Thus, the services B, C, and Y are not currently available.

If the TV set 10 that can use services is limited, as shown in FIG. 5, information about devices (such as the device ID and device name) that can use each service is written in index information. If the format of data files compatible with services is limited, as shown in FIG. 5, data formats compatible with each service are written in index information.

As shown in FIG. 4, the index information described above is managed by the index information management unit 254 of the function expansion server 20. The index information management unit 254 updates index information when necessary in accordance with a change of circumstances of each service. A change of circumstances of a service is, for example, the start, end, or pause of a service by the service server 30, addition/deletion of a compatible service, or a change of service compatible data format.

When, for example, a new upload service A is started by the service server 30, a program of a widget for the upload function that operates in the TV set 10 and index information containing location information of the widget are saved in the function expansion server 20. The program of the widget of the upload service A is saved in the software storage unit 258 of the function expansion server 20 and index information of the upload service A is saved in the information storage unit 252.

If circumstances of each service change, service update information indicating a change of circumstances of a service is transmitted from the service server 30 providing the service to the function expansion server 20. Based on the service update information, the index information management unit 254 of the function expansion server 20 updates index information in the information storage unit 252 to the latest state. If a format of data files compatible with a service is changed, it is necessary to correct a program of software (widget) of an expansion function to provide the service. This is a case, for example, when the upload service that in the past is compatible with only image data in the "JPEG" format is now compatible with also image data in the "RAW" format. In this case, the service server 30 notifies the function expansion server 20 of service update information to that effect. Then, the software correction unit 256 corrects a program of a widget saved in the software storage unit 258 in accordance with the format change. Also, the index information management unit 254 corrects information about formats compatible with the service.

In the manner described above, the function expansion server 20 delivers index information in which the latest service conditions are written to the TV set 10 via the network 5 in response to a request from the TV set 10. By writing index information in a format such as XML (Extensible Markup Language), index information delivered to a plurality of devices via the network 5 can be used in many ways without being dependent on the type and model of devices.

The information receiving unit 152 of the TV set 10 receives the index information from the function expansion server 20 and stores the index information in the information storage unit 154. Thus, the TV set 10 automatically acquires index information about expansion functions that can be executed in the TV set 10 from the function expansion server 20.

Here, the TV set 10 may acquire index information periodically or when an event such as power-on of the TV set 10 occurs. Accordingly, the TV set 10 can automatically acquire related index information without the need for setting changes after the trouble of investigating update circumstances of service being taken. The TV set 10 may also acquire index information from the function expansion server 20 in any timing specified by the user.

When index information being acquired from the function expansion server 20 of the TV set 10, the information request unit 150 may attach attribute information of the request source device (in the present embodiment, the TV set 10) to an acquisition request to be transmitted to the function expansion server 20. Attribute information is, for example, information representing the type, model, production lot, device ID and the like of an information processing apparatus. Based on such attribute information, the function expansion server 20 can select expansion functions that can be executed by the request source device in accordance with the device whose function should be expanded, model, device ID and the like and transmit index information of the selected expansion functions to the request source device. If, for example, the request source device is the TV set 10, the function expansion server 20 selects expansion functions compatible by the TV set 10 and also compatible by the model of the TV set 10. Accordingly, the expansion functions of the request source devices can be added/activated in accordance with the device whose function should be expanded, model, device ID and the like.

Based on the index information, the function control unit 156 controls expansion functions of the TV set 10. For example, based on index information, the function control unit 156 adds, deletes, activates, or inactivates expansion functions of the TV set 10, adds or deletes a compatible service provided by each of the service servers 30, or adds or deletes a compatible format.

Here, addition of an expansion function is to install software (for example, a widget) to execute the expansion function in the TV set 10 by downloading the software and deletion of an expansion function is to uninstall the software from the TV set 10. Activation of an expansion function is to make software (for example, a widget) installed in the TV set 10 executable and inactivation of an expansion function is to make the software non-executable. Addition of a compatible service is, when a new service that is compatible by the TV set 10 is provided, to install software (for example, a widget) used to execute the expansion function of the service in the TV set 10 by downloading the software. Deletion of a compatible service is, when an existing service ends, to uninstall software (for example, a widget) used to execute the expansion function of the service from the TV set 10. Addition/deletion of a compatible format is, when a format of data files compatible by existing services is changed (added/deleted), to correct software (for example, a widget) installed in the TV set 10 in accordance with the change of the format.

The display control unit 158 controls display content of the display unit 160. The display control unit 158 causes an operation menu on the display screen of the display unit 160 to display information (for example, function names) representing expansion functions that can be executed by the TV set 10 based on index information acquired from the function expansion server 20. If, for example, the upload service is newly started, the display control unit 158 causes the operation menu on the display screen to display an operation item "Upload". Accordingly, if a user looks at the menu, the user can recognize that the upload service can be used. Thus, the display control unit 158 adds, deletes, activates, or inactivates the display of information (for example, function names) representing expansion functions displayed in the operation menu of the display screen in accordance with control of expansion functions by the function control unit 156. Details of the display control by the display control unit 158 will be described in detail below (See, for example, FIG. 6 and FIG. 7).

The display unit 160 is a display device that displays various kinds of video in the TV set 10 and is constituted by the display panel 100 described above (See FIG. 2) or the like. The input unit 162 is an apparatus that receives user input into the TV set 10 and is constituted by the remote controller 106 described above (See FIG. 2) or the like.

When an expansion function selected by the user is executed, the download unit 164 downloads software (for example, a widget) used to execute the expansion function from the function expansion server 20 via the network 5. More specifically, when an expansion function such as the upload function is executed in the TV set 10, the user operates the input unit 162 to select a desired expansion function from the operation menu displayed in the display control unit 158. Then, based on location information (for example, URI) of software contained in the index information, the download unit 164 accesses the function expansion server 20 holding the software and requests a download of the software. As a result, the software delivery unit 260 of the function expansion server 20 reads a program of the software (widget) of the expansion function from the software storage unit 258 and transmits the program to the TV set 10 via the network 5. In this manner, the program of the software (widget) is downloaded from the function expansion server 20 to the TV set 10 by the download unit 164 and stored in the software storage unit 166 inside the TV set 10.

When the download of the software of the expansion function is complete, the function execution unit 168 executes the expansion function selected by the user by executing the software. If, for example, the upload function is selected, the function execution unit 168 acquires a user-selected data file (for example, photo data or dynamic image data) to be uploaded from the external storage device 40 or the network storage device 50. Then, the function execution unit 168 uploads the data file to the service server 30 that provides the upload service via the network 5.

Display Screen Example 1

Next, an example of the display screen of the TV set 10 according to the present embodiment will be described with reference to FIG. 6. FIG. 6 is a schematic diagram showing an example of the display screen of the TV set 10 according to the present embodiment.

Figure 6A:
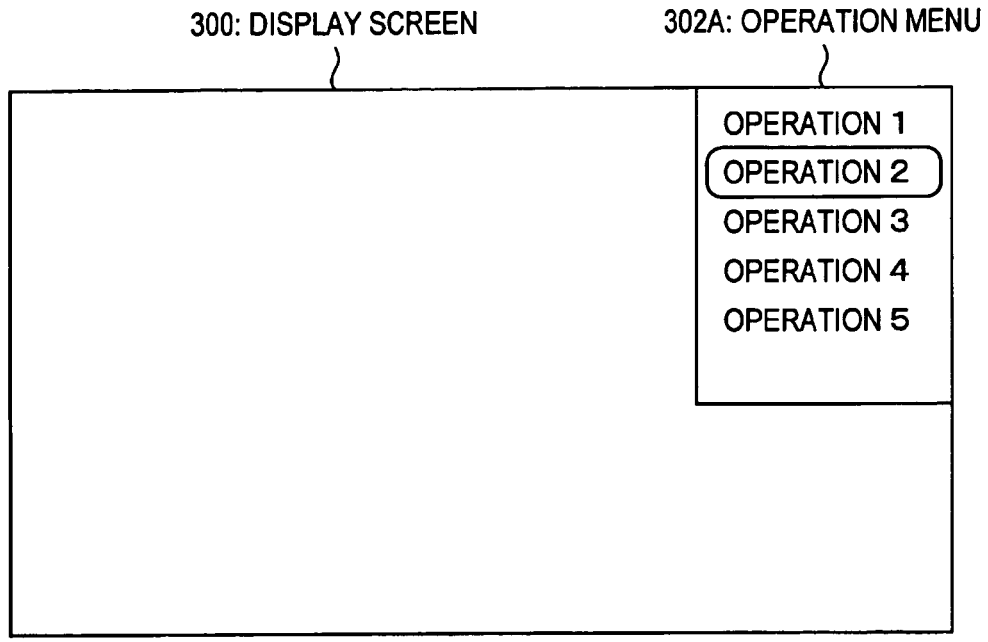
FIG. 6A is a schematic diagram showing an example of a display screen of the television set according to the embodiment.
Figure 6B:
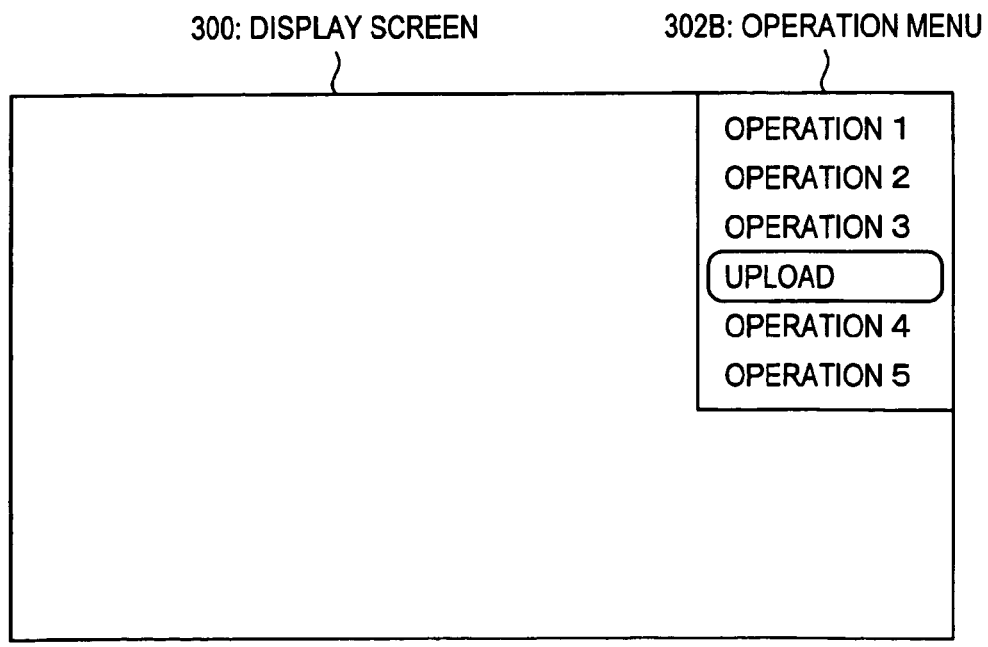
FIG. 6B is a schematic diagram showing the example of the display screen of the television set according to the embodiment.
Figure 6C:
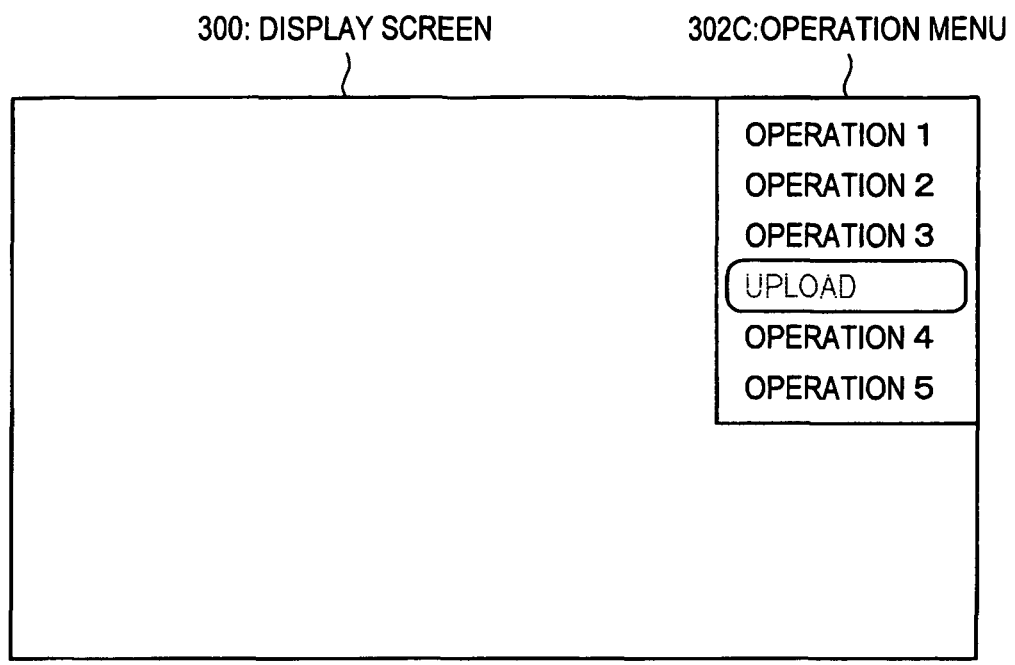
FIG. 6C is a schematic diagram showing the example of the display screen of the television set according to the embodiment.

As shown in FIGS. 6A to 6C, an operation menu 302 showing operation items of the TV set 10 is displayed in a display screen 300 of the display unit 160 of the TV set 10 by the display control unit 158. The operation menu 302 is displayed in a portion (upper right corner in FIG. 6) of the display screen 300 in accordance with, for example, a user operation. The operation menu 302 may be, for example, contextual menu. The contextual menu is a menu in which, when the user specifies an object in the display screen 300 using an operation unit, a list of available operations for the object is displayed and a desired operation can be selected from among operations and executed. If, for example, the user desires some operation on photo data displayed in the display screen 300 of the TV set 10 and an image of the photo data is specified, the operation menu 302, which is a contextual menu, is displayed. Here, the operation is, for example, copying, deletion, editing, or uploading of a data file, display switching or the like.

In an initial state in which the upload function is not installed in the TV set 10, as shown in FIG. 6A, an operation menu 302A including Operation 1 to Operation 5 representing existing and available functions (operations) are displayed in the display screen 300. Operation 1 to Operation 5 are, for example, "Copy", "Delete", "Edit", "Change file name", "Display thumbnail", and "Display image in removable medium 44". At this point, the upload service by the service server 30 is not provided and the TV set 10 has no upload function and thus, an operation item of "Upload" is not displayed in the operation menu 302A.

Subsequently, when the upload service of data by the service server 30 is newly started, a program (for example, script data) of a widget of the upload function and index information containing location information thereof are installed in the function expansion server 20. The TV set 10 can detect the start of the upload service by acquiring index information from the function expansion server 20 via the network 5. As a result, as shown in FIG. 6B, an operation menu 302B including, in addition to the Operation 1 to Operation 5, a new operation (function name) "Upload" is displayed in the display screen 300 of the TV set 10.

Thus, when a new service is added, the display control unit 158 adds the display of "Upload", which is the function name of an expansion function, to the operation menu 302B of the display screen 300 based on index information. Accordingly, the user can recognize that the upload service has started by looking at the operation menu 302B. The TV set 10 may acquire index information periodically in a fixed period or when an event such as power-on of the TV set 10 occurs. Accordingly, acquisition of index information and display changes of the operation menu can automatically be accomplished in a way in which the user is not aware thereof.

The function name (menu choice) of "Upload" is added to the operation menu 302B shown in FIG. 6B. Index information may contain the function name (menu choice name) of such an expansion function and display location information of the function name inside the operation menu 302B. Accordingly, the display mode of the operation menu 302B of the TV set 10 can be controlled by the function expansion server 20.

After the upload service starts, for example, the service may be caused to pause for a period in which the service is temporarily not available due to maintenance or the like. In such a case, the function expansion server 20 updates index information by writing to the service availability information in the index information to the effect that the service not available. Then, the TV set 10 can detect that the upload service is not available by acquiring index information after being updated and checking the service availability information thereof. As a result, as shown in FIG. 6C, the display control unit 158 inactivates the display of the function name "Upload" in an operation menu 302C (for example, changed to a thin character display) so that the user is made incapable of selecting the menu choice of inactivated "Upload".

Then, when the period in which the upload service is caused to pause ends and the service restarts, the TV set 10 can detect that the upload service has restarted by checking index information. As a result, the display control unit 158 activates the display of the function name "Upload" in the operation menu 302C to return to the operation menu 302B shown in FIG. 6B so that the user can select the menu choice of "Upload".

When the existing upload service ends, the function expansion server 20 updates index information by writing to the service availability information in the index information to the effect that the service has ended. Then, the TV set 10 acquires index information after being updated and checks the service availability information to detect that the upload service has ended. As a result, the display control unit 158 deletes the display of the function name "Upload" in the operation menu 302B in FIG. 6C to return to the operation menu 302A shown in FIG. 6A so that the menu choice of "Upload" should not be selected.

As described above, the display control unit 158 of the TV set 10 adds, deletes, activates, or inactivates the display of "Upload", which is the function name of an expansion function, in the operation menu 302 of the display screen 300 based on index information acquired from the function expansion server 20. Accordingly, the user can recognize a change of circumstances of the upload service simply by looking at the operation menu 302 without any special investigation or operation.

Like the display control unit 158, the function control unit 156 of the TV set 10 can detect any change of circumstances of the upload service by checking index information. Accordingly, the function control unit 156 can add, delete, activate, or inactivate an expansion function of a service in the TV set 10 in accordance with a change of circumstances of each service.

Display Screen Example 2

Next, another example of the display screen of the TV set 10 according to the present embodiment will be described with reference to FIG. 7. FIG. 7 is a schematic diagram showing another example of the display screen of the TV set 10 according to the present embodiment.

In the example in FIG. 6 shown above, only one upload service exists and the display of the upload function realized in the TV set 10 by being linked to the upload service is described. In the example in FIG. 7, by contrast, a plurality of upload services provided by a plurality of operators exists and a display example in which the upload function provided by the plurality of different upload services is used for different purposes will be described.

Figure 7A:
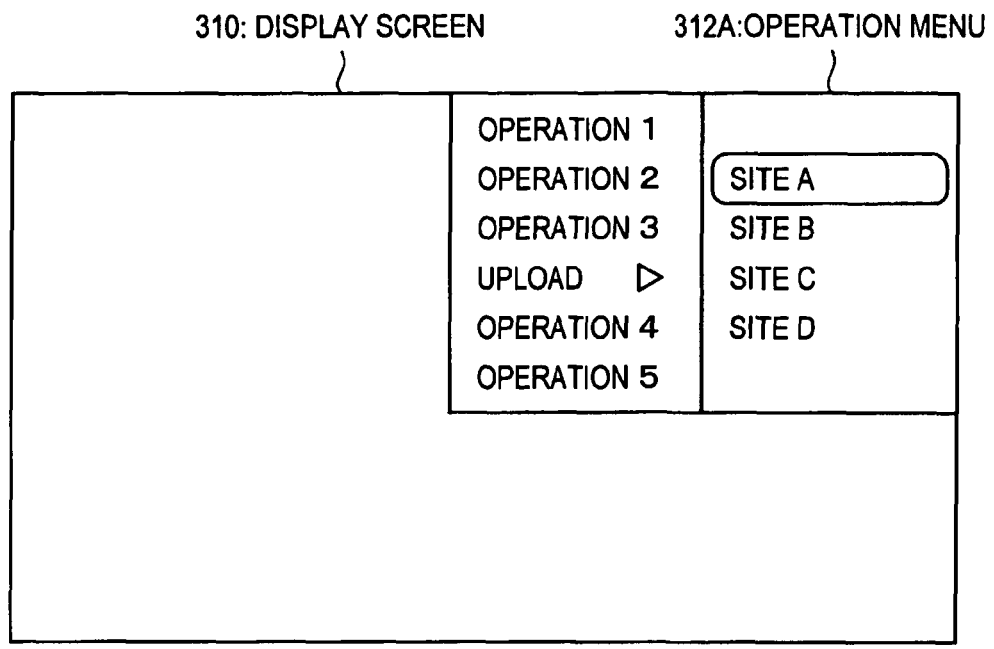
FIG. 7A is a schematic diagram showing another example of the display screen of the television set according to the embodiment.
Figure 7B:
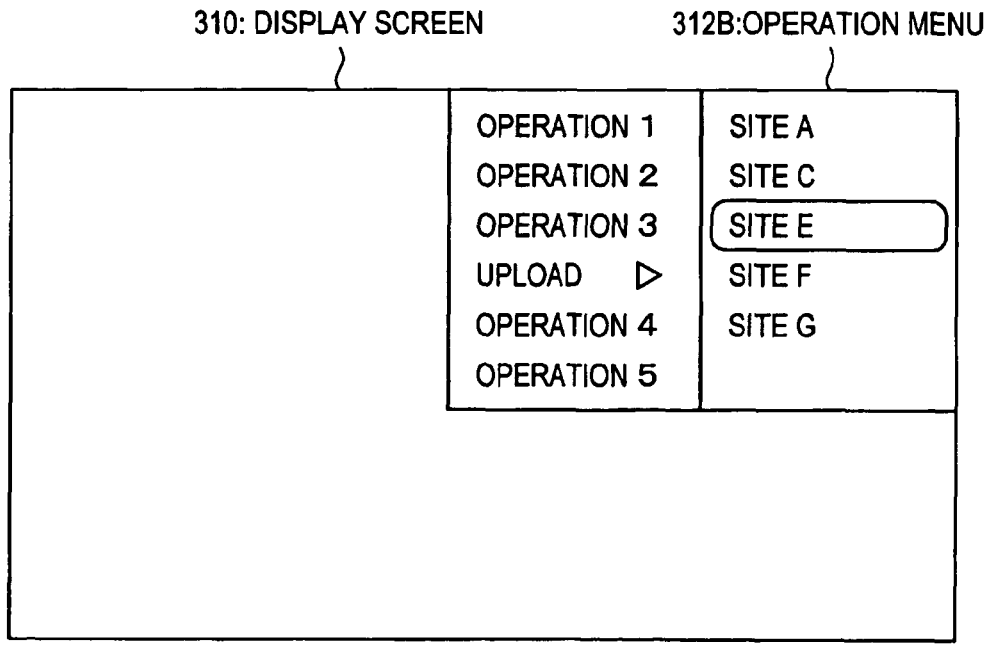
FIG. 7B is a schematic diagram showing the other example of the display screen of the television set according to the embodiment.
Figure 7C:
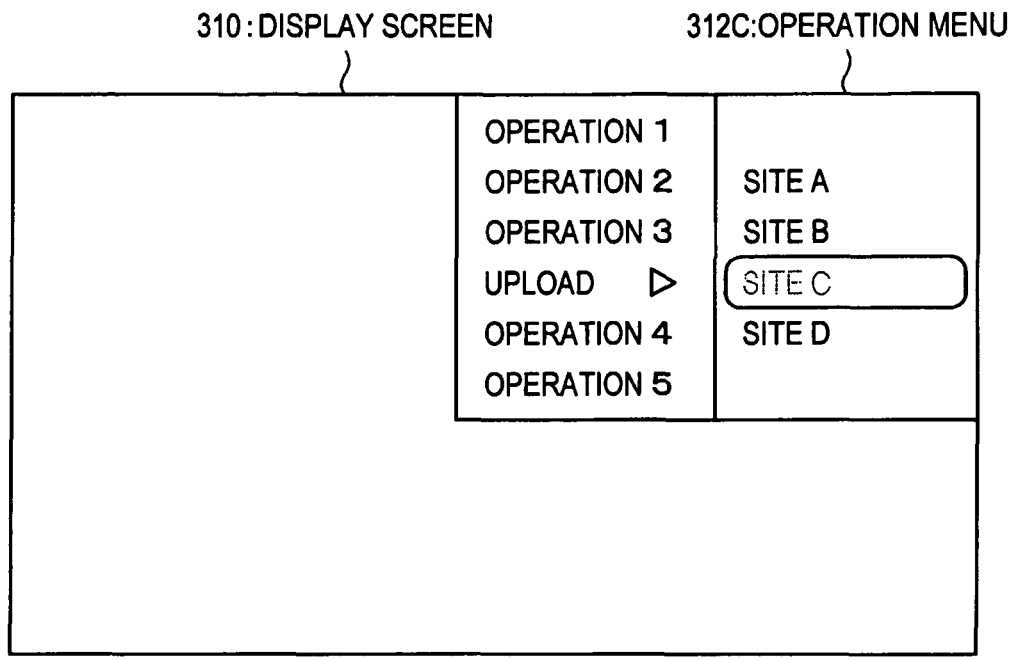
FIG. 7C is a schematic diagram showing the other example of the display screen of the television set according to the embodiment.

As shown in FIGS. 7A to 7C, like in FIG. 6, an operation menu 312 showing operation items of the TV set 10 is displayed in a display screen 310 of the display unit of the TV set 10 by the display control unit 158. In the display screen 310 in FIG. 7, if a plurality of services (sites) for uploading is available, names of such services (hereinafter, referred to as site names) are displayed in the operation menu 312 of the TV set 10. In this case, the display control unit 158 displays information (function name "Upload") representing the upload function and information (site name "Site A" and the like) representing a plurality of services providing the upload function in stages in the operation menu 312 of the display screen 310. At this point, the display control unit 158 lists a plurality of names of sites that provide the upload function as lower-level information of the function name of the upload function based on information about the service contained in index information.

As described above, index information may contain site names of the upload services. Accordingly, the display control unit 158 can detect not only the function name (operation name) of the upload function, but also the plurality of names of services (site names) that provide the upload function by checking index information acquired from the function expansion server 20. Then, if "Upload" is selected from first-layer function names "Operation 1 to Operation 5" and "Upload" in an operation menu 312A of the display screen 310, as shown in FIG. 7A, a second-layer submenu is displayed. The second-layer submenu contains site names "Sites A, B, C, and D" of the plurality of services providing the selected "Upload" function as menu choices. Accordingly, the user can recognize that a plurality of upload services compatible with the TV set 10 exists and also select a desired service from these services.

If, for example, as shown in FIG. 7A, Site A is selected, the download unit 164 accesses the service server 30 of Site A using location information of Site A in index information and downloads a widget of Site A. The upload function linked to Site A is thereby realized.

When a new service (site) starts or an existing service ends, the function expansion server 20 updates service availability information in index information delivered to the TV set 10. Then, the TV set 10 acquires index information after being updated and checks the service availability information so that the TV set 10 can detect that an upload service has started/ended. As a result, the display control unit 158 of the TV set 10 changes display items of the operation menu 312A based on the updated index information and displays, for example, an operation menu 312B shown in FIG. 7B. The operation menu 312B shown in FIG. 7B shows that, when compared with the operation menu 312A shown in FIG. 7A, services of "Site B" and "Site D" have ended and services of "Site E", "Site F", and "Site G" have newly started. Accordingly, the site names of services currently available are automatically displayed in the operation menu 312 of the TV set 10 in almost real time. Therefore, there is no need for the user to investigate and set available services, improving convenience of the user.

If, for example, Site C is caused to pause for a period in which the service is temporarily not available due to maintenance or the like, the function expansion server 20 updates index information by writing to the service availability information in the index information to the effect that the service not available. Then, the TV set 10 can detect that Site C of the upload service is caused to pause by acquiring index information after being updated and checking the service availability information thereof. As a result, as shown in FIG. 7C, the display control unit 158 inactivates the display of "Site C" in an operation menu 312C (for example, changed to a thin character display) so that the user should not select the menu choice of inactivated "Site C". The display control unit 158 may display a message to the effect that Site C is temporarily not available in the display screen 310 when the user selects "Site C".

Then, when the period in which Site C is caused to pause ends and the service restarts, the TV set 10 can detect that Site C of the upload service has restarted by checking index information. As a result, the display control unit 158 activates the display of the function name "Upload" in the operation menu 312C to return to the operation menu 312A shown in FIG. 7A so that the user can select the menu choice of "Site C".

Figure 7D:
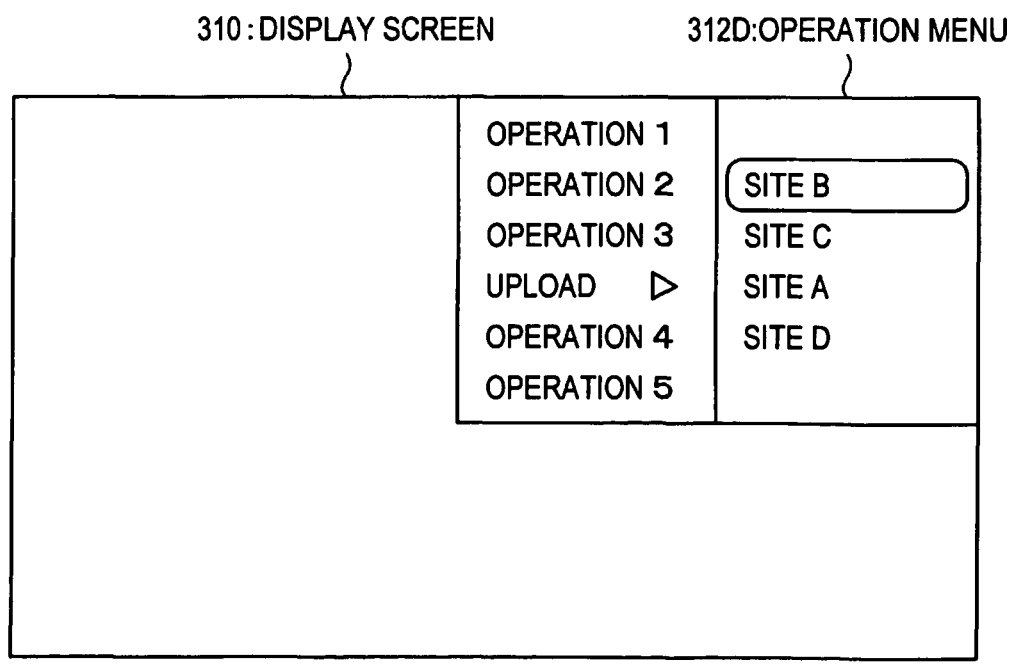
FIG. 7D is a schematic diagram showing the other example of the display screen of the television set according to the embodiment.

Further, as shown in an operation menu 312D shown in FIG. 7D, the order of display of site name choices may automatically be changed in accordance with frequency of usage by the user. In this case, it is preferable to display site names in descending order of frequency of usage. To rearrange the display order in accordance with the frequency of usage, the TV set 10 saves usage history information of the expansion function of each service by the user in a history storage unit (not shown). Then, when the display control unit 158 displays the operation menu 312D, the display control unit 158 determines the frequency of usage of each site based on the usage history information and displays site names in the display order in accordance with the frequency of usage thereof. Accordingly, the user who looks at the operation menu 312D easily determines sites frequently used by the user himself, making service selection more convenient. Needless to say, the display order of sites in the operation menu 312D can manually be set by the user.

With the display control described above, the user can easily recognize addition/deletion of a new expansion function to/from the TV set 10, enabling/disabling of the function, and the start, end, and pause of a service linked to the function. The user can also recognize that a data format compatible with the service has been changed (added/deleted).

Like the display control unit 158, the function control unit 156 of the TV set 10 can detect any change of circumstances of the plurality of upload services by checking index information in almost real time. Accordingly, the function control unit 156 can add, delete, activate, or inactivate the expansion function of each service in the TV set 10 in accordance with a change of circumstances of each service in almost real time.

[Function Expansion Flow]

Figure 8:
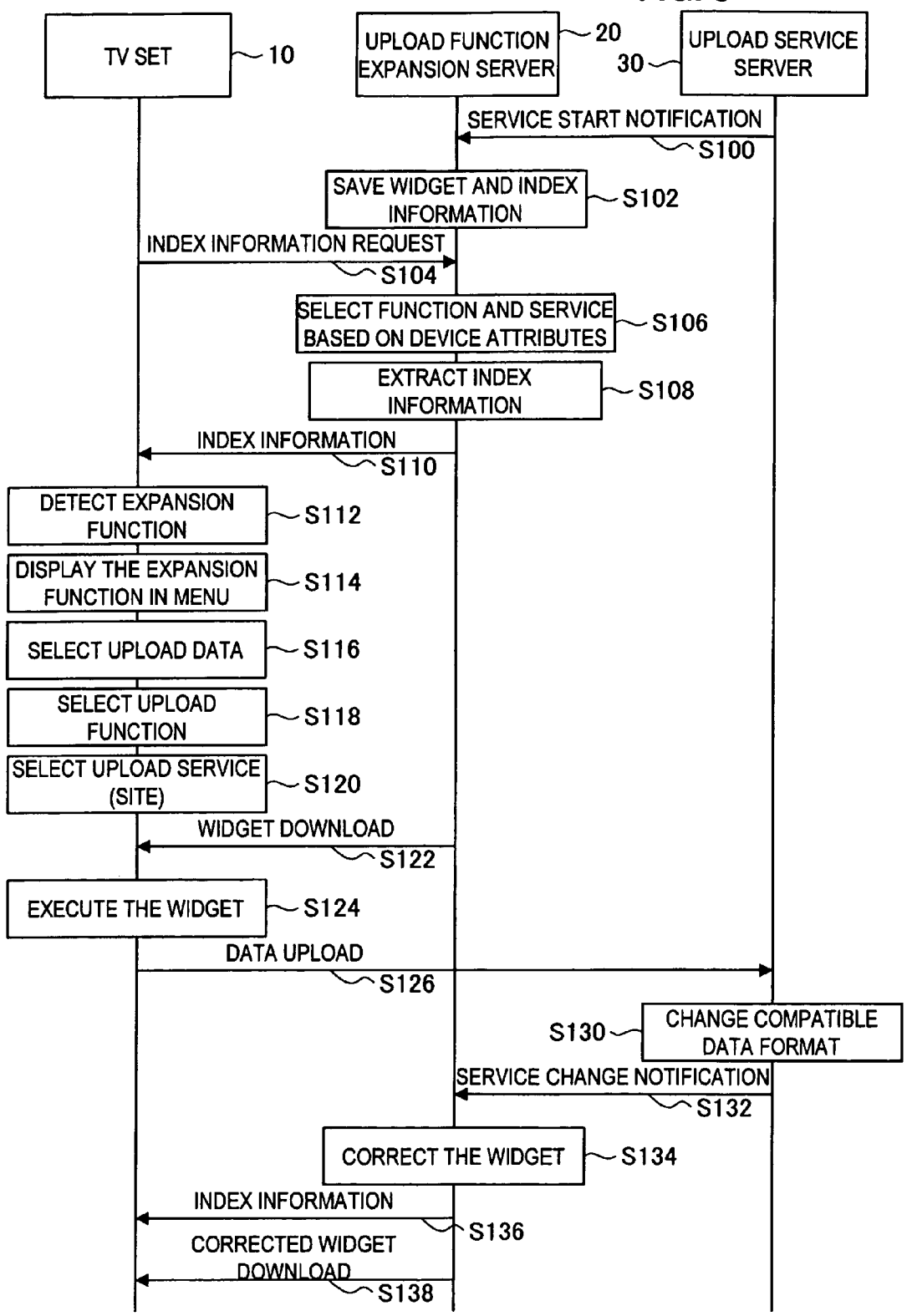
FIG. 8 is a sequence diagram showing an upload function expansion method of the television set according to the embodiment.

Next, the function expansion method in the TV set 10 according to the present embodiment will be described with reference to FIG. 8. FIG. 8 is a sequence diagram showing an upload function expansion method of the TV set 10 according to the present embodiment.

As shown in FIG. 8, when some operator starts an upload service, a service start notification is transmitted from the service server 30 to the function expansion server 20 via the network 5 (S100). Then, the function expansion server 20 saves a program of a widget to realize the upload service provided by the service server 30 and index information of the upload function realized by the widget (S102). The index information contains information such as location information of the widget (URI), the function name of the upload function, service availability information, and service start date/time (See FIG. 5). The function expansion server 20 may acquire the widget and index information from the service server 30, from other devices via communication media or storage media, or from registration work of the administrator of the function expansion server 20.

Then, the TV set 10 requests transmission of index information from the function expansion server 20 by transmitting a transmission request (for example, a request command) of index information to the function expansion server 20 via the network 5 (S104). This request may be transmitted periodically or when an event such as power-on of the TV set 10 occurs. At this point, the TV set 10 attaches attribute information (device information, model information, device ID and the like) of the TV set 10 to the transmission request before transmitting the transmission request to the function expansion server 20.

Next, the function expansion server 20 receives the transmission request of index information from the TV set 10. Further, the function expansion server 20 selects expansion functions and services compatible with the TV set 10 based on attribute information of the TV set 10 attached to the transmission request (S106). The function expansion server 20 can make determinations at S106 by comparing attribute information (device information, model information, device ID and the like) acquired from the TV set 10 and compatible device information contained in index information inside the server 20. Accordingly, the function expansion server 20 determines whether the request source TV set 10 is a device compatible with the upload service.

Next, the function expansion server 20 extracts index information about the expansion functions and services selected at S106 from a plurality of pieces of index information about a plurality of expansion functions and services stored in the information storage unit 252 (S108). Then, the function expansion server 20 delivers the extracted index information to the request source TV set 10 via the network 5 (S110).

Thus, instead of delivering index information about all functions and services to the request source TV set 10, the function expansion server 20 selects functions and services compatible with the TV set 10 based on attribute information of the TV set 10 and delivers index information thereof. That is, different index information depending on the type, model, production lot, device ID and the like of the request source device is delivered to each device. Accordingly, the user terminal of the TV set 10 can be prevented from receiving unnecessary index information not compatible with the TV set 10.

Next, the TV set 10 receives the index information delivered from the function expansion server 20 and saves the index information in the information storage unit 154. From this index information, the function expansion server 20 detects the start of the upload service, expansion function name "Upload", site name of the upload service, location (such as URI) of widget compatible with the upload to each site and the like (S112).

Then, as shown in FIG. 6 and FIG. 7, the TV set 10 additionally displays choices (the function name "Upload", the service name "Site A" and the like) of the newly started upload service in the operation menus 302 and 312 of the display screens 300 and 310 respectively (S114). Accordingly, the user can recognize that the TV set 10 is compatible with the upload function.

Here, an example of the start of a new upload service is described, but in addition, there may be changes of circumstances of services such as the start, end, or pause of services providing various kinds of expansion functions. Also in such cases, the TV set 10 detects a change of circumstances of the service based on index information acquired from the function expansion server 20 and adds, deletes, or activates/inactivates the display of the function name and service name in the operation menu 302 or 312 in accordance with the change (See FIG. 6 and FIG. 7). Accordingly, the user can grasp any change of circumstances of service of the operation menu easily in almost real time.

Further, the function control unit 156 may exercise control so that an expansion function of the TV set 10 is added, deleted, or activated/inactivated based on index information. Accordingly, the expansion functions in the TV set 10 can appropriately be controlled in accordance with a change of circumstances of service and when, for example, a new service starts, the TV set 10 can be compatible with the service.

In order to actually execute the upload function, the user first selects a data file to be uploaded (S116). The data file is saved in the TV set 10, the external storage device 40 such as the removable medium 44 and the HDD 42 connected to the TV set 10, or the network storage device 50 connected via the network 5. The user selects a desired data file to be uploaded from video or icons of a plurality of data files displayed in the display screen of the TV set 10 by, for example, operating the remote controller 106.

Next, the user selects the operation name "Upload" from the operation menu 302 or 312 displayed in the display screen 300 or 310 respectively (S118). If a plurality of upload services exists, a list of "site name" of each upload service is displayed in the operation menu 312 and the user selects the site of the upload destination (S120).

In this manner, the expansion function "Upload" to be executed and the desired service "site name" are selected by the user. Then, the download unit 164 of the TV set 10 downloads a widget to realize the upload function for the site selected by the user using location information of the widget contained in index information (S122).

If, for example, the widget for the site selected by the user is saved in the function expansion server 20 and the URI thereof is written in index information, the TV set 10 downloads the widget from the function expansion server 20. However, the present invention is not limited to such an example and the server that delivers index information and the server that delivers widgets may be different. For example, the server that delivers widgets may be the service serve 30 or any other server connected to the network 5.

Then, the TV set 10 uploads the data file selected at S116 to the service server 30 using the service selected by the user at S120 by executing the downloaded widget (S124). The uploaded data file is saved in the service server 30 or another external apparatus. In this manner, the user can upload data selected by the user to the site (that is, the service server 30) selected by the user using a widget via the network 5.

The format of data files that can be uploaded depends on the upload service (site). Here, if formats compatible with the upload service are changed, the widget of the service is corrected to deal with the change.

It is assumed, for example, that a service for uploading photo data that compatible with only the JPEG format is now compatible with also the RAW format. In this case, the format of data uploaded from the TV set 10 to the service server 30 can be expanded by correcting a program of the widget of the service saved in the function expansion server 20.

More specifically, if, as shown in FIG. 8, the format of data files compatible with some upload service is updated (S130), the service server 30 of the service notifies the function expansion server 20 of the change of the format (S132).

Then, if a correction is necessary, the function expansion server 20 rewrites the program of the widget of the service so as to be compatible with both JPEG and RAW formats and also updates compatible format information contained in index information of the widget (S134). Then, if the TV set 10 detects that compatible formats have been changed by acquiring the updated index information from the function expansion server 20 (S136), the TV set 10 also downloads the updated widget (S138). Since the widget is downloaded during execution of uploading, the user can typically use a program of the latest widget.

Accordingly, when the upload function is used next time, the TV set 10 can upload photo data not only in the JPEG format, but also in the RAW format by executing the expanded widget. Here, uploading of photo data, which is still image data, is taken as an example, but if, for example, the type of data file to be uploaded is music data or dynamic image data, compatible data types and formats can be expanded in a similar way.

In the foregoing, the first embodiment of the present invention has been described. According to the first embodiment, an expansion function (such as the upload function) realized by being linked to a service in an embedded device such as the TV set 10 is realized by a widget, and the widget is downloaded from the function expansion server 20 to the embedded device. That is, the embedded device acquires index information of expansion functions from the function expansion server 20 and saves in advance so that widgets of the expansion functions can typically be downloaded. Then, when execution of a function is started, the embedded device downloads the latest widget reflecting circumstances of the service at that time from the function expansion server 20 based on index information thereof and executes the widget. The index information contains service availability information, function IDs (widget IDs), upload service names (site names) and the like and such information is displayed in the operation menu of the display screen of the embedded device. Accordingly, the user can easily recognize expansion functions that can be realized in the embedded device and any change of circumstances of services that provide the expansion functions.

When a new service starts, a widget is saved in the function expansion server 20 and then, addition of the service is written to index information and the index information is delivered to an embedded device. Accordingly, even an embedded device in which, in contrast to a PC, a computer system with low versatility is mounted can have an expansion function by a new service added thereto reactively after the manufacture of the device. Moreover, by using index information, an expansion function of an embedded device can be added, deleted, or activated/inactivated such as deletion or pause of a service by flexibly responding to a change of circumstances of service.

According to the present embodiment, as described above, an expansion function can be added, deleted, or activated/inactivated or a compatible service can be added/deleted easily in almost real time in accordance with a change of circumstances of the service providing the expansion function. By reflecting a change of circumstances of such a service in a display item of the operation menu, the user can easily recognize the change of circumstances. Further, addition/deletion of an expansion function or service can suitably be changed depending on the type, model or the like of an embedded device.

Second Embodiment

Next, the TV set 10 according to the second embodiment of the present invention will be described. The TV set 10 in the second embodiment has, in addition to the function configuration of the first embodiment, a function to automatically select a service to be used using the format of data files to be uploaded. The function configuration of the second embodiment excluding the above function is substantially the same as that of the first embodiment and thus, a detailed description thereof is omitted.

[Service Selection Flow]

FIG. 9 is a flow chart showing a service selection flow in the TV set 10 according to the second embodiment. The processing flow in FIG. 9 corresponds to the service selection step S120 in FIG. 8 shown above.

In the first embodiment, if a plurality of upload service exists when the upload function is executed by the TV set 10, all services (site names) are listed in the operation menu 312 and the user manually selects a desired service (See FIG. 7). However, according to such a technique, services that are not compatible with formats of data files to be uploaded are also listed so that even if the user selects such a service, a data file may not actually be uploaded.

Thus, in the second embodiment, available services are automatically selected using formats of data files to be uploaded and then, selected available services are displayed in the operation menu. The technique thereof will be described below in detail.

As shown in FIG. 8, when a data file is uploaded by the TV set 10, the user first selects a data file to be uploaded (S116). Next, when the user selects the choice of the function name "Upload" from the operation menu 312 (S118), a plurality of services (site names) providing the upload function is displayed in the operation menu 312 and the user selects a desired service from the operation menu 312 (S120). At S120, the TV set 10 according to the second embodiment performs the flow of processing in FIG. 9.

That is, as shown in FIG. 9, the TV set 10 first detects the format of the data file selected by the user and to be uploaded (S1202). The TV set 10 can detect the format of a data file by checking metadata (for example, attribute information of the file, the extension of the file name and the like) attached to the data file.

Next, the display control unit 158 automatically selects upload services compatible with the format detected at S1202 from a plurality of upload services based on the compatible format information contained in the index information (S1204). As shown in FIG. 5, data formats compatible with each service are written in index information. Therefore, services compatible with the format of the data file to be uploaded can be selected based on index information. In the example in FIG. 5, if the data file to be upload has the "RAW" format, services A to C are compatible, but a service D is not.

Then, the display control unit 158 causes the operation menu of the display screen to display the service names (site names) of the upload services selected at S1204 (S1206). As a result, only names of services compatible with the format of the data file to be uploaded are displayed in the operation menu and names of incompatible services are not displayed. Thus, by selecting any service name in the operation menu, the data file can be uploaded using the service.

Next, if one service in the operation menu is selected by using the remote controller 106 or the like, the display control unit 158 instructs the download unit 164 to download the widget of the service (S1208).

According to the second embodiment, as described above, in addition to effects of the first embodiment, a following effect is achieved. In the second embodiment, upload services compatible with the format of the data file to be uploaded are selected and only service names of such services are displayed in the operation menu. Therefore, the data file can be uploaded by selecting any service in the operation menu. Consequently, user convenience can be improved when a data file is uploaded using the TV set 10.

It should be understood by those skilled in the art that various modifications, combinations, sub-combinations and alterations may occur depending on design requirements and other factors insofar as they are within the scope of the appended claims or the equivalents thereof.

In the above embodiments, for example, the TV set 10 is taken as an example of the information processing apparatus and an example in which the upload function in the TV set 10 is expanded is described. However, the information processing apparatus of the present invention is not limited to such examples and can be applied to, for example, any embedded device having an embedded system as a computer system such as consumer electric appliances and industrial equipment. The embedded device may be, for example, a recording/reproducing apparatus such as a camcorder, camera, and DVD/HDD player/recorder, washing machine, refrigerator, rice cooker, air conditioner, digital camera, printer, copying machine, home game machine, or other home information appliances. In addition, the embedded device may be a portable terminal such as a portable game machine, portable video/audio player, PDA (Personal Digital Assistant), automobile, vending machine, or ticket machine. The information processing apparatus of the present invention is not limited to the above examples of embedded device and may be applied to, for example, various kinds of computer devices equipped with a general-purpose computer system such as a personal computer (PC) and server apparatus.

In addition to the upload function described above, the present invention can be applied to the whole area of functions realized by being linked to a service in an embedded device. For example, the present invention can be applied to various functions realized by using network communication between an information processing apparatus and a server apparatus such as the download function, receiving function of delivery content, and receiving function of delivery information such as the weather, fortune-telling, and news.

In the above embodiments, information about expansion functions (such as the function name and service name) is displayed in the operation menu 302 or 312, but the display mode of the operation menu is not limited to examples shown in FIG. 6 or FIG. 7 and the design thereof can be changed when necessary. Information about expansion functions may be displayed in any other menu than the operation menu as long as such information is displayed in a list form in the menu.

What is claimed is:

1. An information processing apparatus, comprising:
   an information receiving unit that receives index information about one or more expansion functions from an external expansion server realized by being linked to predetermined services provided by an external service server connected via a network, wherein the index information contains;
   i. information representing a required data file format with which an upload service provides an upload operation,
   ii. information representing an availability of an upload service of a plurality of upload types to the information receiving unit, and
   iii. information about a plurality of services that provide the same type of expansion function;
   a display control unit that displays a menu of information representing the expansion functions on a display screen, based on the index information, wherein the menu of information dynamically indicates different upload types of available upload services that are compatible with the information receiving unit; the menu is a contextual menu in which, when the user specifies an object on the display screen, all available upload services and their corresponding operations that are compatible with the object are displayed on the display screen and subsequently selectable for downloading in accordance with a user selection;
   a download unit that downloads software for executing the expansion function based on location information of the software when the expansion function being executed in accordance with a user selection on the menu on the display screen, wherein the location information is contained in the index information as address information representing the storage location of the software,
   a function execution unit that uses the downloaded software to execute the expansion function based on the operation selected by the user, and
   periodically updating the index information indicating that a new operation is available for the object, and automatically adding the new operation for the object into the contextual menu.

2. The information processing apparatus according to claim 1, wherein the expansion function is an upload function to upload a data file from the information processing apparatus to the external service server, and the display control unit detects a format of the data file to be uploaded, automatically selects an upload service compatible with the detected format from among a plurality of upload services based on the information representing the format contained in the index information, and displays the menu of the information about the selected upload service on the display screen.

3. The information processing apparatus according to claim 1, wherein the display control unit adds, deletes, activates, or inactivates a display of the information representing the expansion function in the menu on the display screen based on the index information.

4. The information processing apparatus according to claim 3, wherein the expansion function is a function realized by communication performed between the external service server providing the predetermined service and the information processing apparatus via the network, and the display control unit adds, deletes, activates, or inactivates the display of information representing the expansion function in the menu on the display screen based on the information representing the availability contained the index information.

5. The information processing apparatus according to claim 1, wherein the display control unit displays the menu of the information representing the expansion function and information representing the plurality of services on the display screen in stages based on the information about the services contained in the index information, and the download unit downloads the software for executing the expansion function of the service selected by the user in accordance with a user selection on the menu on the display screen.

6. The information processing apparatus according to claim 5, wherein the display control unit displays the information representing the plurality of services in the menu on the display screen in a display order in accordance with at least one of a usage frequency of the plurality of services and settings by the user.

7. The information processing apparatus according to claim 1, further comprising an information request unit that transmits a transmission request of the index information to the external service server via the network, wherein the information request unit attaches attribute information of the information processing apparatus to the transmission request of the index information, and then transmits the transmission request to the external expansion server, the information receiving unit receives the index information about the expansion functions selected by the external expansion server using the attribute information from the external service server, and the display control unit displays the menu of the information representing the expansion functions selected by using the attribute information on the display screen, based on the index information.

8. The information processing apparatus according to claim 1, wherein the information processing apparatus is a device equipped with an embedded system as a computer system.

9. The information processing apparatus according to claim 1, wherein the software is a widget.

10. A function expansion method, comprising the steps of:
    receiving, by an information processing apparatus, index information about one or more expansion functions from an external expansion server realized by being linked to predetermined services provided by an external service server connected via a network, wherein the index information contains;
i. information representing a required data file format with which an upload service provides an upload operation,
ii. information representing an availability of an upload service of a plurality of upload types to the information receiving unit, and
iii. information about a plurality of services that provide the same type of expansion function;
displaying, by the information processing apparatus, a menu of information representing the expansion functions on a display screen, based on the index information; wherein the menu of information dynamically indicates different upload types of available upload services that are compatible with the information receiving unit; the menu is a contextual menu in which, when the user specifies an object on the display screen, all available upload services and their corresponding operations that are compatible with the object are displayed on the display screen and subsequently selectable for downloading in accordance with a user selection;
downloading, by the information processing apparatus, software for executing the expansion function based on location information of the software when the expansion function being executed in accordance with a user selection on the menu on the display screen; wherein the location information is contained in the index information as address information representing the storage location of the software, and
using, by the information processing apparatus, the downloaded software to execute the expansion function based on the operation selected by the user, and
periodically updating the index information indicating that a new operation is available for the object, and automatically adding the new operation for the object into the contextual menu.

* * * * *